March 10, 1970 R. F. FISCHER ET AL 3,500,348

SHIFT REGISTER PULSE GENERATOR INCLUDING FEEDBACK LOOP

Filed Feb. 8, 1966 2 Sheets-Sheet 1

INVENTORS: R.F. FISCHER
R.A. KAENEL
BY Herbert M. Shapiro
ATTORNEY

SHIFT REGISTER PULSE GENERATOR INCLUDING FEEDBACK LOOP

Filed Feb. 8, 1966 2 Sheets-Sheet 2

United States Patent Office 3,500,348
Patented Mar. 10, 1970

3,500,348 SHIFT REGISTER PULSE GENERATOR INCLUDING FEEDBACK LOOP

Robert F. Fischer, Livingston, and Reginald A. Kaenel, Chatham, N.J., assignors to Bell Telephone Laboratories, Incorporated, New York, N.Y., a corporation of New York Filed Feb. 8, 1966, Ser. No. 536,170
Int. Cl. G11b *5/00;* H04q
U.S. Cl. 340—174 18 Claims

ABSTRACT OF THE DISCLOSURE

A domain wall countdown circuit comprising an integrated pseudo-random "pulse" generator and a character recognizer is disclosed. The pulse generator provides ever-changing patterns of reverse-magnetized domains at its output. The patterns of reverse domains are propagated through the character recognizer but arrive at its output only if the recognizer is not reset in the interim.

This invention relates to magnetic circuits and, more particularly, to magnetic countdown circuits.

A countdown circuit is one which provides an output pulse for a given number of events. Such circuits are in widespread use to satisfy, for example, various pulsing requirements from a master clock as is well known.

Shift registers including re-entrant (feedback) loops are known to provide pseudo-random characters which are particularly useful for providing the countdown function. The shift registers generates continuously changing characters in response to succeeding clock pulses and an associated character recognizer provides an output in response to the generation of the proper character. Such an arrangement is described in "Digital Communications With Space Applications," Golomb et al., Prentice Hall/EE Series, chapter II and appendix 3. Although such arrangements are relatively attractive for relatively long characters when compared to existing alternatives as, for example, the storage of the sequence to be generated, they are still quite expensive.

Accordingly, an object of this invention is a new and novel countdown circuit.

The invention is based on the realization that the character modifying information provided via the re-entrant loop of the character generator of such an arrangement may be used advantageously to, in a sense, custom tailor an obstacle course in an associated character recognizer for the corresponding information at the output of the character generator. The invention is based, further, on the realization that a domain wall device may be utilized to provide the function of both the pseudo-random character generator and the character recognizer in a relatively simple and inexpensive integrated structure.

A domain wall device for reference, is a device including a magnetic medium, conveniently a wire, of a material in which a reverse magnetized domain is provided in response to a first field in excess of a nucleation threshold and through which that reverse domain is advanced in response to a second field in excess of a propagation threshold and less than the nucleation threshold. Domain wall devices are operated typically by providing a first field in a limited portion of the wire and, thereafter, providing spaced apart and oppositely poled second fields in a step-along fashion, by means of a four-phase pulse sequence, to advance the reverse domain to a remote output position. The device, then, operates as a shift register and a re-entrant loop therein permits the pseudo-random character generating function as described in the previously mentioned publication.

In one embodiment of this invention, each character, in the form of a pattern (the presence and absence) of reverse domains, generated by the domain wall character generator is advanced past re-entrant (feedback) loop coupling, along an extension of the domain wall wire towards a remote output. The character reaches the remote output only for the proper character, an all-zero code, which is generated once every $2^n-1$ propagation pulse sequences where $n$ is the number of stages in the character generator. For each improper character, the extension of the domain wall wire is reset, collapsing (erasing) all reverse domains in the portion of the wire coupled thereby, thus preventing an output. The reset operation is in response to a pulse generated in the re-entrant loop responsive to the passage, by the re-entrant loop coupling, of each reverse domain not spaced apart one position from a next preceding reverse domain. The pulse in the re-entrant loop is applied to a reset (erase) coil, coupled to the extension of the domain wall wire.

Accordingly, a feature of this invention is a domain wall device including an input portion defined between an input position and a coupling of a re-entrant loop and an output portion coupled by a reset coil and terminating in an output position wherein each reverse domain in the device which passes the coupling of the re-entrant loop induces a pulse in the reset coil for resetting (erasing) that output portion unless the domain is spaced apart one position from a next preceding reverse domain.

The foregoing and further objects and features of this invention will be understood more fully from a consideration of the following detailed description rendered in conjunction with the accompanying drawing wherein.

Figure 1:
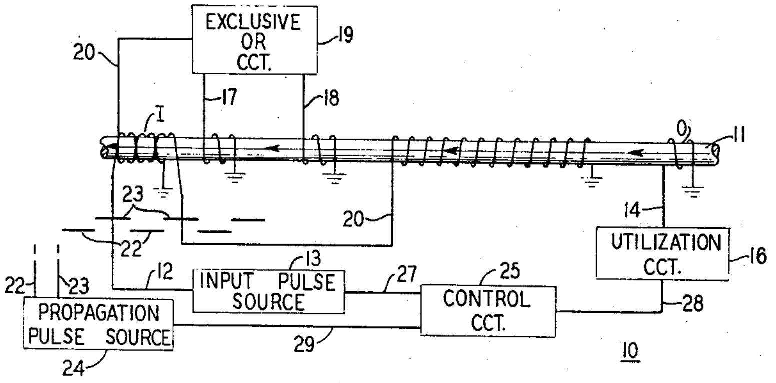
FIG. 1 is a schematic illustration of a countdown circuit in accordance with this invention.

More specifically, FIG. 1 shows a countdown circuit 10 in accordance with this invention. The circuit comprises a domain wall wire 11. A conductor 12 is coupled to an input position I of wire 11 and is connected between an input pulse source 13 and ground. Similarly, a conductor 14 is coupled to a spaced apart output position O of wire 11. Conductor 14 is connected between a utilization circuit 16 and ground. First and second positions spaced apart one position along an intermediate portion of wire 11 are coupled by conductors 17 and 18, respectively. This positioning of the conductors 17 and 18 along the wire 11 is discussed more fully hereinafter. Conductors 17 and 18 are connected between an exclusive-OR circuit 19 and ground. A reset conductor 20 is coupled to the portion of wire 11 between the positions therealong coupled by conductors 18 and 14. Conductor 20 is also coupled to the input position I of wire 11 to which conductor 12 is also coupled. Conductor 20 is connected, further, between exclusive-OR circuit 19 and ground.

Propagation conductors, represented by horizontal lines 22 and 23, are each coupled serially and in alternating senses to spaced apart positions along wire 11 to provide, when pulsed, opposing second fields for stepping reverse domains through wire 11. Propagation conductors 22 and 23 are connected between a propagation pulse source 24 and ground. The arrangement of the propagation conductors and the operation thereof is described in copending application Ser. No. 515,897, filed Dec. 23, 1965, for R. A. Kaenel now Patent No. 3,430,001.

Input pulse source 13, utilization circuit 16, and propagation pulse source 24 are connected to a control circuit 25 via conductors 27, 28, and 29, respectively. The various sources and circuits may be any such elements capable of operating in accordance with this invention.

As has been indicated hereinbefore, the circuit of FIG. 1 may be understood most easily in terms of the cooperation of a pseudo-random character generator and a character recognizer. The character generator portion of the countdown circuit is that portion of wire 11 between the input position I coupled by conductor 12 and the positions coupled by conductors 17 and 18 as shown in FIG. 1. That portion of wire 20 between the exclusive-OR circuit 19 and the input position functions to modify continuously the information stored in wire 11 as propagation pulse sequences are applied. Information is modified by varying the pattern (the presence and absence) of reverse magnetized domains, and the modification occurs in response to a pulse induced in conductor 17 or conductor 18 responsive to the passage of a reverse domain thereby. The modification of stored information, more specifically, comprises the insertion of an additional domain at the input position via exclusive-OR circuit 19 in response to each pulse so induced. It is noted that exclusive-OR circuit 19 functions to provide no pulse when a pulse is so induced concurrently in both conductors 17 and 18.

Each reverse domain so inducing pulses in conductors 17 and 18 is advanced along the extension of wire 11 to the output position for inducing a pulse in conductor 14. It is noted, however, that each pulse provided by exclusive-OR circuit 19 for providing a reverse domain at the input position also resets (via conductor 20) the portion of wire 11 between the position coupled by conductor 18 and the output position O for collapsing domains traversing that portion of wire 11. Accordingly, a reverse domain arrives at the output position only if it is followed by a number of zeros (absence or reverse domains) corresponding to the number of positions coupled by conductor 20 between the position of wire 11 coupled by conductor 18 and the output position. Therefore, the portion of the circuit of FIG. 1 between the position coupled by conductor 18 and the output position may be thought of as a character recognizer.

In certain telephone applications telephone lines are served, conveniently, in groups of 2048. Accordingly, a frequently encountered use of a countdown circuit requires one output for every 2047 ($2^n-1$) propagation pulse sequences. For telephone supervisory circuits (scanning circuit) of, for example, the (domain wall) type described in copending application Ser. No. 464,066, filed June 15, 1965, for U. F. Gianola, R. A. Kaenel and H. E. D. Scovil, now Patent No. 3,430,001, such a countdown circuit performs an auditing function for determining the condition of a different one of 2048 telephone lines each time the associated scanning circuit scans those lines. Conveniently, propagation circuitry for the scanning circuit and a countdown circuit in accordance with this invention is shared. An illustrative operation of the countdown circuit of FIG. 1 will now be described for the provision of one output for 2047 ($2^{11}-1$) propagation pulse sequences compatible with the described auditing function. An $n=11$ (stage) shift register is employed for the character generator.

For such an operation, wire 11 is selected to be of a length to accommodate 23 ($2n+1$ for an 11 bit character) bit positions. As is well known, bit positions in domain wall wires are spaced apart by buffer zones. In other words, reverse domains may be positioned in a domain wall wire four propagation pulses apart (one propagation pulse sequence). This positioning is discussed in the aforementioned copending application.

Figure 2:
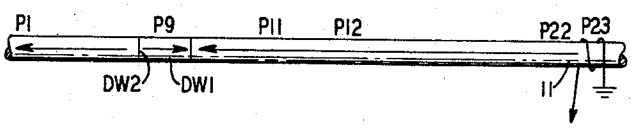
FIG. 2 is a schematic illustration of a portion of the countdown circuit of FIG. 1.

FIG. 2 shows the positions, designated P1 . . . P23, to which the various conductors shown in FIG. 1 are coupled to the wire 11. The input position then is located at position P1, the couplings of conductors 17 and 18 are at positions P9 and P11, respectively, the reset coupling of conductor 20 extends from position P12 to position P22, and the output coupling is located at position P23. The foregoing arrangement of conductors 17 and 18 is consistent with the teaching of the above-mentioned publication (see sepcifically appendix 3, page 195). Any input character for such an arrangement repeats every 2047 propagation pulse sequences. No matter what character is used initially, a sequence of ten zeros and a one appears with a periodicity which is a function of the length of the shift register and the position of the re-entrant loop couplings. An output pulse appears at a time depending on the length and position of the reset coupling.

The operation is demonstrated for an input code of 00000000001 (ten zeros and a one) where the one is represented by a reverse domain and each zero is represented by the absence of a domain. The domain wall wire is assumed initialized to a first (forward) magnetization direction represented by arrows directed to the left in FIG. 1. A reverse domain is represented by an arrow directed to the right. Initialization of the wire 11 may be insured by coupling input conductor 12 along the entire wire 11 in a sense opposite to that in which conductor 12 couples the input position. A pulse in conductor 12, then, provides a reverse domain in the input position and initializes the remainder of the wire simultaneously.

In operation, input pulse source 13 applies an initiating pulse to conductor 12 for providing a reverse domain at position P1. Thereafter, propagation pulse source 24 applies alternately to conductors 22 and 23 for advancing the reverse domain. Both sources 13 and 24 are under the control of control circuit 25. The propagation pulses are first of one polarity on each of (interleaved) conductors 22 and 23 and then of the opposite polarity on each, the four pulses, two positive—two negative for example, comprising a propagation sequence.

Figure 3:
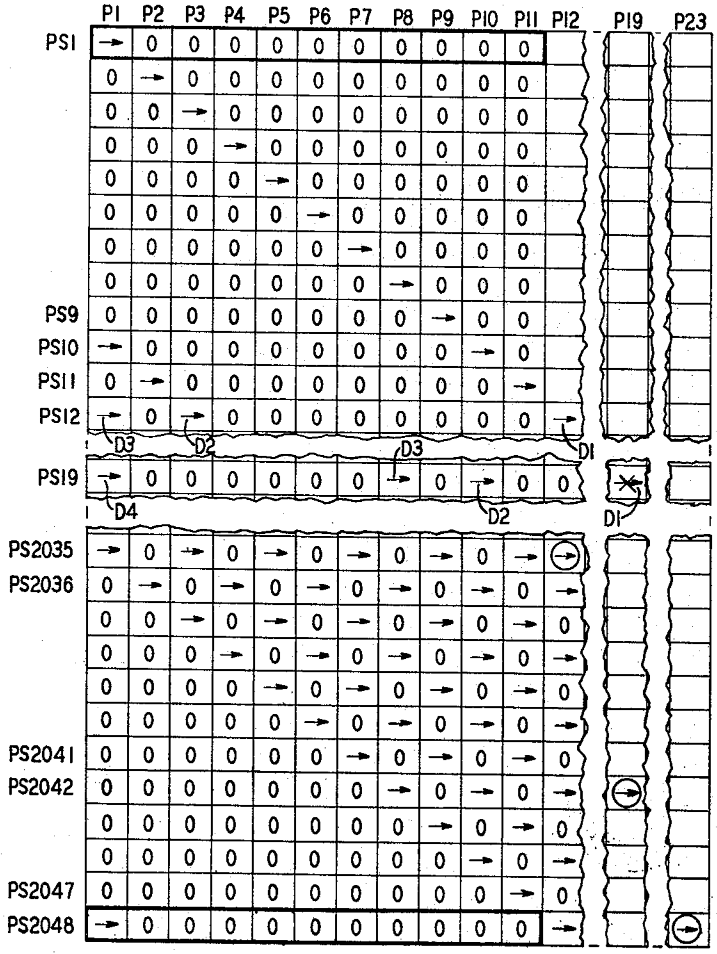
FIG. 3 is a chart of flux pattern changes in the portion of the countdown circuit, illustrated in FIG. 2, during the operation thereof.

FIG. 3 shows a chart of the advance of the reverse domain. For each propagation sequence, designated PS$z$ where $z$ takes values sequentially from one to 2048, the domain is advanced to the next adjacent position. The number of each pulse sequence is noted to the left of the representation of the magnetic condition of wire 11 existing in the wire when that pulse sequence is initiated. It is to be appreciated that each row of the chart corresponds to a representation of the magnetization of wire 11 at the time the corresponding propagation pulse sequence is initiated.

No further inputs are required. The countdown circuit provides a reverse domain for inducing a pulse in output conductor 14 every 2047 pulse sequences. This is clear from the chart of FIG. 3. The chart is incomplete, for simplicity, but includes a representation of the salient features of the operation. Specifically, succeeding pulse sequences PS1 to PS2 advance the receive domain to the right as viewed. When pulse sequence PS9 is applied, a reverse domain induces a pulse in conductor 17 (FIG. 1). In turn, an additional reverse domain is nucleated in position P1 and the first reverse domain is advanced to position P10. This is depicted by the horizontal representation corresponding to pulse sequence PS10 in FIG. 3.

A word of caution: A reverse domain defines leading and trailing domain walls with the bounding forward domains as is represented by the vertical lines designated DW1 and DW2, respectively, in FIG. 2. The leading and trailing domain walls induce pulses of opposite polarity as they pass a conductor such as 17. Conductors 17 and 18, illustratively, are arranged to respond only to the trailing wall of a passing domain. The coupling of conductor 20 to the input position is adjusted to provide an additional reverse domain compatible with the concurrently applied pulse of the pulse sequence.

When pulse sequence PS11 is applied, the first reverse domain couples conductor 18, providing another reverse domain at position P1 as depicted in the representation corresponding to the pulse sequence designated PS12. It is convenient to designate the domains by a D plus a numeral corresponding to the order in which they are provided. Thus, domain D1 is the first reverse domain; D2 and D3 follow as shown in the representation at PS12. Note that domain D1 has advanced to position P12 and is now in the portion of the wire 11 coupled by the reset conductor 20.

Seven pulse sequences thereafter, domain D2 advances out of position P9 into position P10 and thus induces a pulse in conductor 17 for providing a domain D4 in position P1. This is shown in the representation of wire 11 in FIG. 3 corresponding to pulse sequence PS19. Domain D4 is provided in response to the pulse in conductor 17 which activates exclusive-OR circuit 19 which, in turn, pulses conductor 20. That pulse in conductor 20 also resets the portion of wire 11 between the position thereof coupled by conductor and the output position. Consequently, domain D1 which is advanced to position P19 at this time is destroyed as indicated by the X through the representation of domain D1 as shown in FIG. 3 at PS19.

The pulse sequences continue, additional domains being generated and destroyed in the manner described. A pattern of alternating reverse domains and absent reverse domains periodically appears in positions P1 through P11 followed (actually preceded) by a reverse domain in position P12 as shown at PS2035 in FIG. 3. The domain in position P12 is shown encircled because, as will be seen, that domain provides the output pulse during the pulse sequence PS2048.

Specifically, the advance of the domains for pulse sequences PS2035 through PS2048 is depicted in FIG. 3. Pulse sequence PS2041 advances the encircled domain to position P19 as shown in FIG. 3 at PS2042. Remember that the magnetic condition of wire 11 after a particular pulse sequence is applied is represented by the next succeeding row in FIG. 3. It is noted that when PS2041 is initiated positions P9 and P11 are occupied by reverse domains and exclusive-OR circuit 19 provides a null under those conditions. It is clear that the encircled domain is advanced to position P23, coupled by the output conductor 14, by the pulse sequences PS2035 through PS2047. The output conductor 14 is arranged to detect the trailing domain wall and so has a properly poled pulse induced therein during the pulse sequence PS2048 for activating utilization circuit 16 under the control of control circuit 25.

The representation of the condition of wire 11 before pulse sequence PS2048 is applied is shown in FIG. 3 at PS2048. It is noted that the character for positions P1 through P11 is the same as the initial pattern. The cycle now repeats for each additional 2047 pulse sequences without additional inputs via conductor 12.

The illustrative operation was for a ten zero code. A countdown circuit in accordance with this invention, however, may be adapted to other all-zero codes. Importantly, the reset conductor is of a length and in a position to pass a reverse domain therebeneath only if the characters "reentered" into and generated by the character generator during the time of passage are properly related. For the illustrative operation, where 2047 pulse sequences ($2^n-1$ sequences), where $n=11$, are applied, the reset "coil" (conductor 20 coupling) is $n-1$ or ten positions long. Moreover, the reset coil starts in the position next adjacent the position coupled by conductor 18. Although unnecessary, the output position is next adjacent the termination of the reset coil.

For any $n$, the reset coil extends at most over $n-1$ positions. If a coil of length $n-2$ starts four positions from the position coupled by conductor 18, two outputs are provided, one when each of codes 00000000001 and 00000000011 is in the character generator. Similarly, if a reset coil $n-2$ bit positions long is positioned two bit positions from that coupled by conductor 18, an output pulse is provided by each of codes 00000000010, 00000000001. Since each selected character is spaced apart a particular number of positions from a second selected character, a repositioning of the reset coil provides pulses spaced apart differently.

Other changes in length and position of the reset coil change the length of the coded character detected and when that character is detected, as is clear from the foregoing. Thus a pulse program may be provided by a shortening or by a repositioning and a shortening of the illustrative reset coil to provide output pulses in response to a number of codes. Alternatively, additional magnetic wires may be provided in parallel with wire 11 with reset coils of different lengths and in different positions but connected to conductor 20 to this end.

Figure 4:
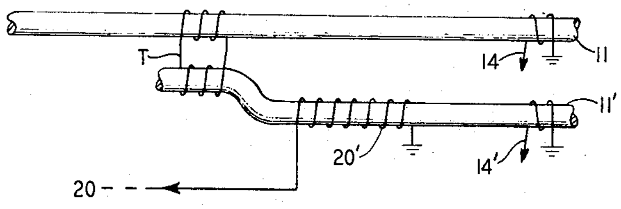
FIGS. 4 and 5 are schematic illustrations of different modifications of the countdown circuit of FIG. 1.

FIG. 4 depicts a representation of one arrangement with such an additional wire 11' conveniently coupled to wire 11 (of FIG. 1) by a representative transfer loop T. The reset coil on the second wire 11' is of a length and in a position different from that shown in FIG. 1. Operation is entirely analogous to that described for the circuit of FIG. 1, pulses being generated in output conductors 14 and 14' during different propagation pulse sequences.

Figure 5:
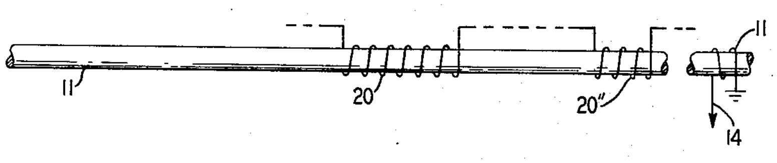

FIG. 5 illustrates an alternative arrangement where reset (erase) coils are electrically in series coupling magnetic wire 11 over different lengths and with predesignated spacings therebetwen. The numeral designations are the same as in FIG. 1 to facilitate a comparison therewith. Only one additional reset coil, designated 20", is illustrated. Operation again is entirely analogous to that described hereinbefore, each reset coil operating to inhibit ones of the domains which passed the preceding coils. The ones of the domains so inhibited depend on the spacing between and the lengths of the coils. It is clear that the arrangement permits the generation of a pulse program or, alternatively, enables a code recognition depending on the choice of coil lengths and spacings.

The positions of conductors 17 and 18 (the re-entrant loop couplings of FIG. 1) also are important. Illustratively, those conductors couple positions P9 and P11. For providing outputs at different times, the couplings may be varied. Various positions for the couplings as well as suitable lengths (number of stages or bit positions) in the character generator are well known as shown in Appendix 3 of the aforementioned publication.

The invention, then, is based on the realization that the character modifying information inherent in a (re-entrant loop) pseudo-random character generator of the type described may be utilized as reset (erase) information. Accordingly, for any given positioning of the couplings for the re-entrant loop, a simple reset coil may be provided of a length and in a position to take advantage of that reset information to erase all reverse domains in the character recognizer except when the corresponding character in the character generator is an all-zero code. Thus, an output is permitted only when that character appears. This operation inheres regardless of the initiating input character because a code including a number of zeros corresponding to the number of bits (less one) in the character occurs with a like periodicity which is a function of the number of stages in the character generator and the positions of the re-entrant loop couplings. Therefore, structural simplicities are achieved in accordance with this invention by capitalizing on the fact that an "all-zero" code is generated with a periodicity corresponding to that of any input character.

What has been described is considered to be only illustrative of the principles of the invention. Accordingly, various and numerous other arrangements may be devised by one skilled in the art without departing from the spirit and scope of this invention.

What is claimed is:

1. In combination, a character generator including an input, said character generator also including a feedback loop for providing character modifying information to said input, and a character recognizer responsive solely to said character modifying information in said feedback loop to selectively recognize only that character generated by said character generator when said character modifying information corresponds to an all-zero code.

2. In combination, a character generator including an input and an output, said character generator also including a feedback loop for providing character modifying information to said input, and a character recognizer responsive solely to said character modifying information in said feedback loop to selectively pass therethrough only that character generated by said character generator at said output when said character modifying information corresponds to an all-zero code.

3. A combination in accordance with claim 2 wherein said character generator is an $n$ stage first shift register and said feedback loop includes an exclusive-OR circuit coupled to the $n$th and $(n-2)$th stage of said shift register.

4. A combination in accordance with claim 3 wherein said character recognizer comprises an $m$ greater than $n$ stage second shift register connected in series with said character generator and operated synchronously therewith for advancing therethrough the characters generated by said character generator, said second shift register including means for resetting a preselected number of said $m$ stages in response to said character modifying information.

5. A combination in accordance with claim 4 wherein said first and second shift registers comprise domain wall wires wherein information characters are stored as the presence and absence of reverse magnetized domains.

6. A combination in accordance with claim 4 wherein said first and second shift registers comprise a single domain wall wire.

7. A combination in accordance with claim 6 wherein said domain wall wire includes $2n+1$ bit positions, said feedback loop being coupled to said wire at the $n$th and $(n-2)$th positions for activating said exclusive-OR circuit in response to the advance of each reverse domain not spaced apart one bit position from the next preceding domain past the couplings of said exclusive-OR circuit for providing character modifying information.

8. A combination in accordance with claim 7 also including a reset coil coupled to said domain wall wire between said $n$th and $(2n+1)$th positions responsive to said character modifying information for erasing all reverse domains in that portion of said wire coupled thereby.

9. A combination in accordance with claim 8 wherein said reset coil couples said domain wall wire over $n-1$ positions.

10. A combination in accordance with claim 8 wherein said reset coil couples said domain wall wire over fewer than $n-1$ positions.

11. A combination in accordance with claim 9 wherein said reset coil couples said domain wall wire over $n-1$ positions starting with the $(n+1)$th position.

12. A combination in accordance with claim 11 including an output coupled to said wire at the $(2n+1)$th position.

13. A combination in accordance with claim 3 wherein said character recognizer comprises a plurality of second shift registers of $m$ greater than $n$ stages each connected in series with said character generator and operated synchronously therewith for advancing therethrough the characters generated by said character generator, each of said second shift registers including means for resetting a different preselected number of stages therein responsive to said character modifying information.

14. A combination in accordance with claim 13 wherein said first and said plurality of second multistage shift registers comprise domain wall wires wherein information characters are stored as the presence and absence of reverse magnetized domains.

15. A combination in accordance with claim 14 wherein the means for resetting preselected numbers of stages of each of said plurality of second shift registers includes a reset coil coupled to different numbers of stages thereof.

16. A combination in accordance with claim 5 wherein said second shift register includes means for simultaneously resetting preselected and different numbers fewer than $n-1$ of said $m$ stages responsive to said character modifying information.

17. A combination in accordance with claim 6 wherein said second shift register includes means for simultaneously resetting preselected and different numbers fewer than $n-1$ of said $m$ stages responsive to said character modifying information.

18. A countdown circuit comprising a magnetic domain wall wire including input and output positions separated by an intermediate portion, input means for generating a reverse magnetized domain at said input position, propagation means for providing propagation pulse sequences for moving reverse domains through said wire, feedback means coupled to a first position of said intermediate portion of said wire, reset means coupled to said intermediate portion of said wire between said first position and said output position, said feedback and said reset means being responsive to the passage of each reverse domain not spaced apart one position from a next preceding reverse domain for providing a reverse domain at said input position and for erasing reverse domains between said first position and said output position respectively, said reset means including a coupling of a length and in a position for determining the number of propagation pulse sequences applied for each output pulse provided, and output means coupled to said output position of said wire for providing an output pulse in response to the arrival of a reverse domain there.

References Cited

UNITED STATES PATENTS

| | | | |
|---|---|---|---|
| 3,069,657 | 12/1962 | Green et al. | 340—171 |
| 3,368,203 | 2/1968 | Loizides | 340—172.5 |
| 3,164,728 | 1/1965 | Harding | 307—88 |
| 3,295,114 | 12/1966 | Snyder | 340—174 |

BERNARD KONICK, Primary Examiner

K. E. KROSIN, Assistant Examiner

U.S. Cl. X.R.

340—168, 173